Patented June 28, 1932

1,865,378

UNITED STATES PATENT OFFICE

JOHN W. LIVINGSTON, OF KIRKWOOD, AND MAX LUTHY, OF ST. LOUIS, MISSOURI, ASSIGNORS TO MONSANTO CHEMICAL WORKS, OF ST. LOUIS, MISSOURI, A CORPORATION OF MISSOURI

PROCESS FOR PRODUCING CAFFEIN

No Drawing.  Application filed August 5, 1927.  Serial No. 211,000.

This invention relates to the production of caffein.

The main object of our invention is to provide a practicable process by which relatively high yields of caffein can be produced at a low cost from theobromine.

It has been known that theobromine can be converted into caffein by methylation, and although this appears to be a simple reaction, the processes heretofore disclosed for producing caffein in this manner are not entirely successful from a commercial standpoint, as they only give yields of caffein ranging from 35% to 92% by weight, while the theoretical yield for this reaction is 107.7% by weight. The known processes for converting theobromine into caffein by methylation use methyl iodide, di-methyl sulphate, or p-toluol-sulpho-methyl ester as methylating agents. Such methylating agents not only give rather low yields of caffein, but they have other disadvantages. For example, methyl iodide is expensive and requires the recovery of the iodine, and dimethyl sulphate has only one methyl group available for the methylation under ordinary condition. It is also highly toxic.

We have discovered that if methyl chloride is used as the methylating agent in converting theobromine into caffein, that a yield of caffein almost equal to the theoretical yield will be obtained. In addition to obtaining a high yield of caffein, such a process materially reduces the cost of producing caffein, as methyl chloride is much less expensive than methyl iodide, dimethyl sulphate or other methylating agents heretofore used to convert theobromine into caffein. Moreover, methyl chloride can be handled safely, and conveniently, either in liquid or gaseous form, or dissolved in organic solvents.

Still another advantage of our process is that no by-products are formed which interfere with the isolation or refining of the caffein. It is surprising that methyl chloride causes a practically theoretical yield in this conversion, whereas, other methylating agents, such as methyl iodide and dimethyl sulphate, which in other methylations generally work better than methyl chloride, are reported in the literature of the prior art as giving in the case of the methylation of theobromine a rather poor yield.

Our process, briefly described, consists in subjecting theobromine or a salt of theobromine, to treatment with methyl chloride until the theobromine is converted into caffein. The treatment can be carried out in various ways. It will usually consist in allowing the methyl chloride to react upon a solution or suspension of theobromine, or react on theobromine or a salt of theobromine suspended in or dissolved in water or an organic solvent, such, for instance, as methyl alcohol. The salt of theobromine can be obtained in any well known way, as, for example, by stirring theobromine and alkali or alkali earth or metal oxide, or hydroxide capable of forming a salt of theobromine, in water or in organic solvent until the salt is formed. A slight excess of the base is preferable, but not absolutely necessary. If theobromine instead of a salt of theobromine is used, it is necessary to add some alkaline or basis substance capable of neutralizing the hydrochloric acid formed in the methylation. The methylation can be carried out at room temperature and atmospheric pressure, it can be carried out much more rapidly at higher temperatures and pressures greater than atmospheric pressure, or it can be carried out at room temperature and pressures higher than atmospheric pressure. When a temperature in excess of room temperature is used the temperature range may vary from 20° C. to 150° C.

The following procedure may be used to produce caffein from a salt of theobromine; 180 lbs. theobromine are dissolved in 930 lbs. of 4.5% sodium hydroxide solution. The theobromine goes readily in solution. This solution of the sodium salt of theobromine is then methylated in a suitable autoclave by heating the solution to 70° C. and then adding 53 lbs. of methyl chloride at such a rate that the pressure in the autoclave will be maintained at about 50 lbs. per square inch, the temperature of the solution being maintained at approximately 70° C. The batch has to be stirred efficiently during the reaction to bring the methyl chloride into intimate contact with the solution. The temperature of the batch rises slightly during the reaction. After all the methyl chloride is added the batch is heated to 85° C. and held at this temperature until the pressure in the autoclave has dropped to 10 or 15 lbs. per square inch. This point is reached in usually about two hours' time. The dilution of the batch at the temperature specified is sufficient to have the caffein completely in solution.

The batch is blown into crystallizers, and upon cooling, the main portion of the caffein crystallizes out and is recovered by filtration. The mother liquor contains 2-3% of caffein and some theobromine. This latter material can be recovered by neutralizing the alkalinity, whereby the therobromine precipitates out and can be recovered by filtration. The caffein remaining in the mother liquor can be recovered by further evaporation and crystallization. If a good quality of theobromine is used, a total of 181-186 lbs. of anhydrous caffein and up to 8 lbs. of theobromine will be obtained by the procedure above described.

The conditions under which the methylation is carried out can obviously be changed in some directions without sacrificing any advantages of the process, and without departing from the spirit of our invention. If desired, the methylation can be carried out with a quantity of methyl chloride less than the amount specified in the example given above, and a correspondingly larger quantity of theobromine will be recovered.

Having thus described our invention, what we claim and desire to secure by Letters Patent is:

1. The process for producing caffein which comprises causing methyl chloride to act on a solution or suspension containing theobromine while maintained at a pressure above atmospheric pressure.

2. The method of producing caffein which comprises heating theobromine and methyl chloride under positive pressure and in the presence of an aqueous solution of a basic material capable of neutralizing hydrogen chloride formed during the methylation.

3. The method of producing caffein which consists in adding methyl chloride to an aqueous solution of salt of theobromine while maintaining a temperature of 20°–150°.

4. The method of producing caffein which comprises causing methyl chloride while maintained at a pressure above atmospheric pressure to act on a solution of a salt of theobromine.

5. The method as defined in claim 1 further characterized in that the solution or suspension contains a material capable of neutralizing the hydrogen chloride as formed during the methylation.

6. In a process for converting theobromine into caffein by the action of methyl chloride, the step of separating caffein from theobromine from the mother liquor of the caffein by crystallization which consists in neutralizing said mother liquor, filtering off the theobromine and recovering caffein by evaporation and crystallization of the filtrate.

JOHN W. LIVINGSTON.
MAX LUTHY.